(12) United States Patent
Keays

(10) Patent No.: US 7,798,119 B2
(45) Date of Patent: Sep. 21, 2010

(54) INTERNAL COMBUSTION WATER INJECTION ENGINE

(75) Inventor: Steven J. Keays, Calgary (CA)

(73) Assignee: Lonox Engine Company, Inc., Sandstone, MN (US)

( * ) Notice: Subject to any disclaimer, the term of this patent is extended or adjusted under 35 U.S.C. 154(b) by 0 days.

(21) Appl. No.: 12/582,397

(22) Filed: Oct. 20, 2009

(65) Prior Publication Data

US 2010/0037851 A1 Feb. 18, 2010

Related U.S. Application Data

(62) Division of application No. 11/690,676, filed on Mar. 23, 2007.

(60) Provisional application No. 60/743,714, filed on Mar. 23, 2006.

(51) Int. Cl.
 *F02M 57/06* (2006.01)
 *F02B 47/02* (2006.01)

(52) U.S. Cl. ..................... 123/297; 123/25 A

(58) Field of Classification Search ............... 123/25 A, 123/25 J, 297, 25 C
See application file for complete search history.

(56) References Cited

U.S. PATENT DOCUMENTS

| 885,820 | A | 4/1908 | Winand |
|---|---|---|---|
| 1,986,630 | A | 1/1930 | Fowler |
| 2,218,522 | A | 10/1940 | Butler |
| 2,671,311 | A | 3/1954 | Rohrbach |
| 3,074,228 | A | 1/1963 | Lee |
| 3,608,529 | A | 9/1971 | Smith et al. |
| 3,990,408 | A | 11/1976 | Kroll |
| 5,012,772 | A | 5/1991 | Nakamura |
| 5,154,142 | A | 10/1992 | Kamo |
| 5,237,964 | A | 8/1993 | Tomoiu |
| 5,400,746 | A | 3/1995 | Susa et al. |
| 5,718,194 | A | 2/1998 | Binion |
| 5,816,228 | A | 10/1998 | McCandless |
| 5,937,799 | A | 8/1999 | Binion |
| 6,095,100 | A | 8/2000 | Hughes |
| 6,202,613 | B1 | 3/2001 | Nagai |
| 6,289,853 | B1 | 9/2001 | Walczak et al. |
| 6,571,749 | B2 | 6/2003 | Singh |
| 6,955,154 | B1 * | 10/2005 | Douglas ..................... 123/297 |
| 6,986,252 | B2 | 1/2006 | Hedman |
| 2004/0149256 | A1 * | 8/2004 | Dye et al. ................... 123/297 |

(Continued)

FOREIGN PATENT DOCUMENTS

DE 4201836 A1 7/1993

(Continued)

OTHER PUBLICATIONS

European Search Report dated Dec. 15, 2008, 5 pages.

*Primary Examiner*—Hai H Huynh
(74) *Attorney, Agent, or Firm*—Fredrikson & Byron, P.A.

(57) ABSTRACT

An internal combustion system and a water injection nozzle to position a water mist within an internal chamber of an internal combustion engine. In one form, the apical cone of the injection is altered with respect to the position of the piston within the interior chamber. In another form, the air fuel mixture is charged at an opposing charge to the water mist to create a water droplet gaseous fuel mixture for combustion within the anterior chamber.

4 Claims, 14 Drawing Sheets

U.S. PATENT DOCUMENTS

| | | | |
|---|---|---|---|
| 2006/0169244 A1* | 8/2006 | Allen | 123/297 |
| 2007/0186877 A1* | 8/2007 | Schulz | 123/25 A |
| 2008/0098984 A1* | 5/2008 | Sakamaki | 123/297 |

FOREIGN PATENT DOCUMENTS

| | | | |
|---|---|---|---|
| EP | 0553364 | A1 | 4/1993 |
| EP | 1319816 | A2 | 6/2003 |
| GB | 2147947 | A | 5/1985 |
| JP | 58133449 | | 8/1983 |
| JP | 3115729 | A | 5/1991 |
| WO | 9931204 | A1 | 6/1999 |

* cited by examiner

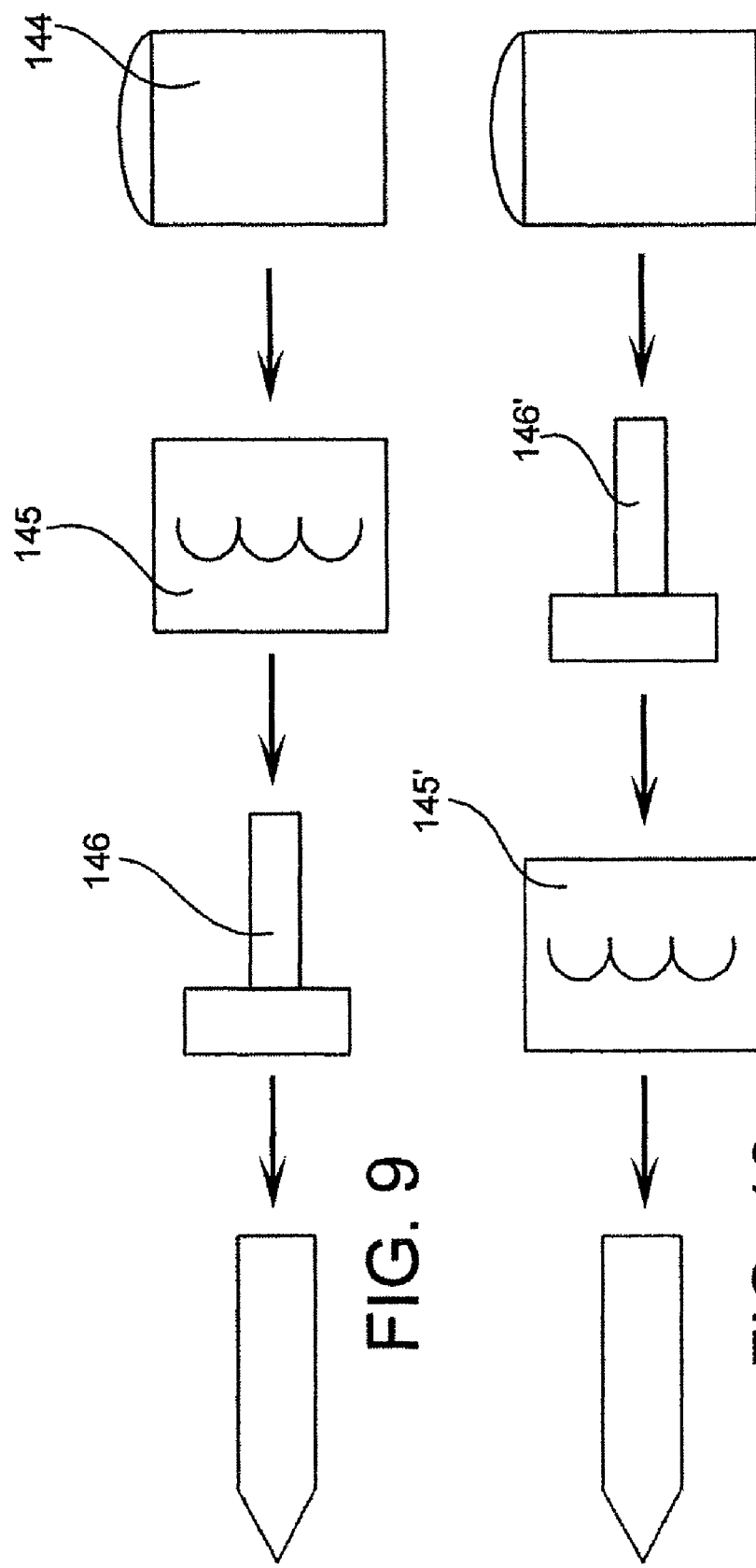

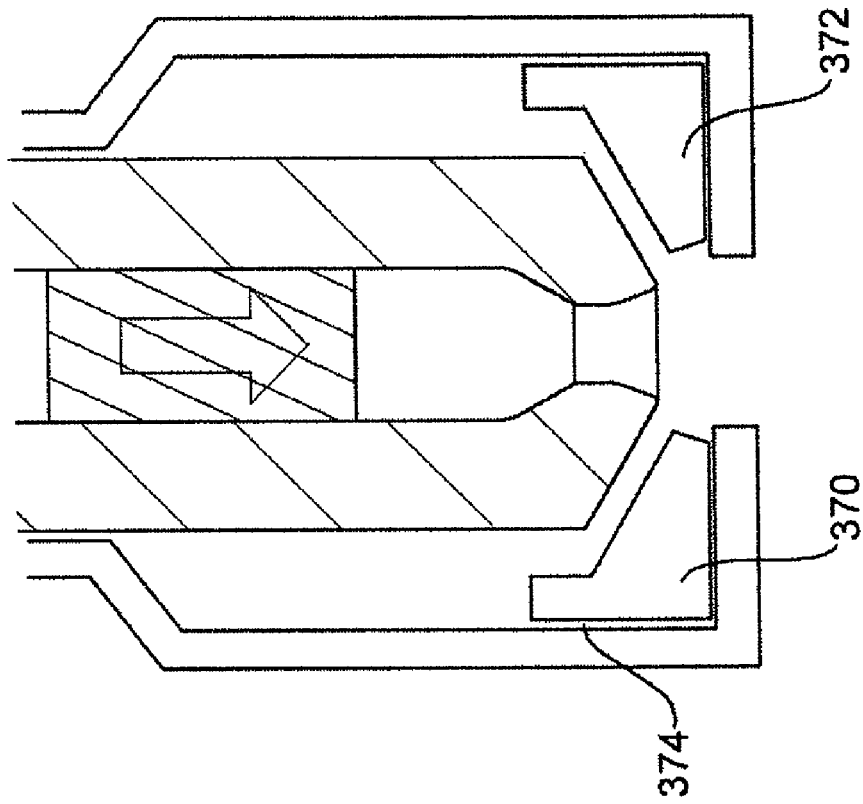
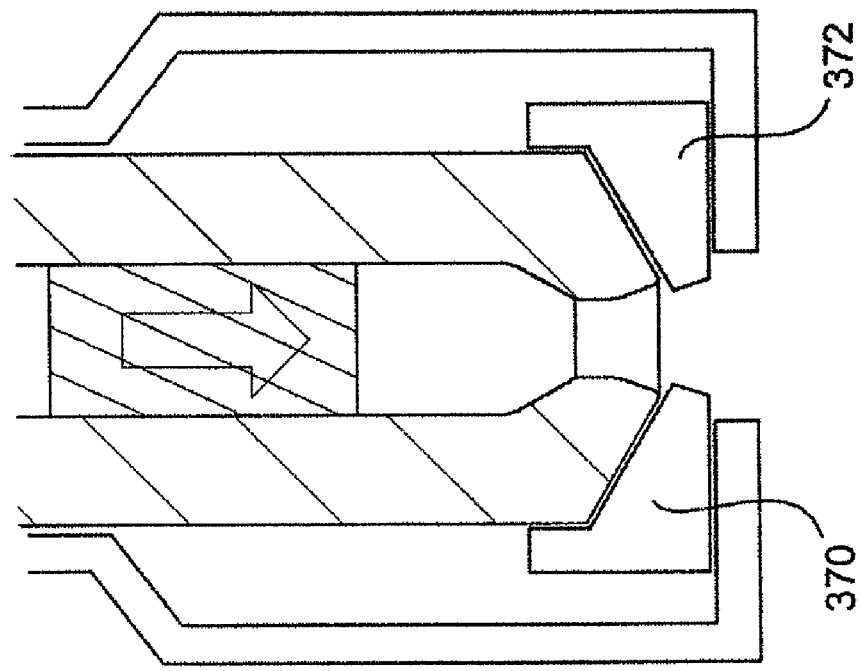

INTERNAL COMBUSTION WATER INJECTION ENGINE

RELATED APPLICATIONS

This application is a divisional of U.S. patent application Ser. No. 11/690,676, titled INTERNAL COMBUSTION WATER INJECTION ENGINE, filed Mar. 23, 2007, which itself claims priority to U.S. Provisional Application Ser. No. 60/743,714, titled INTERNAL COMBUSTION WATER INJECTION ENGINE, filed Mar. 23, 2006, the contents of both of which are hereby incorporated by reference.

BACKGROUND

In general, the apparatus and system as described below relates to a water injection-type system adapted to inject water droplets in a very fine mist into a combustion chamber. More specifically, the apparatus is a rotary piston engine, and in one form, a static constant speed engine. Of course, the teachings herein can be applied to other types of engines, such as static variable speed, mobile platform constant speed, and mobile platform variable speed.

The introduction of water droplets inside a piston chamber, prior to the ignition of the fuel-air mixture, will produce a reduction in combustion temperature in the exhaust gases, through the evaporation of the water droplets. In the proper proportions and configuration, the water droplets will reduce the temperature below the threshold, above which nefarious greenhouse gases such as NOx and CO are normally produced. A secondary benefit of the process is a net increase in available shaft power from the engine, and a reduction in gas consumption.

SUMMARY OF THE DISCLOSURE

Disclosed herein is an internal combustion engine system having water injected into the engine for reducing NOx gases. The internal combustion engine system comprises an engine casing having an interior cylinder having a cylindrical wall portion. There is also a piston having an upper surface and a perimeter annular edge portion. The piston operatively configured to be repositioned within the interior cylinder in an oscillating manner and further being connected to a crankshaft.

An ignition member is provided with anode and cathode portions optimally configured to provide an ignition spark within the interior cylinder.

A fuel air input valve and an exhaust valve are configured to insert a fuel air mixture into the interior cylinder and remove combusted gas respectively. The piston, interior cylinder and fuel air input and exhaust valves have relative positions so the piston has a downward fuel air intake stroke, an outward fuel air compression stroke, a downward power stroke, and an upward exhaust stroke.

A nozzle member is provided having a main body and a nozzle tip region in communication with the interior chamber. The nozzle member comprises an actuator to alternatively allow communication of the nozzle tip region to a high-pressure water source and to discontinue communication of the nozzle tip region to the high-pressure water source. The nozzle further has a spray cone adjustment system where the cross-sectional open area of the nozzle member at the nozzle tip region is repositioned up from a narrower orientation to disburse a narrower apical angle of a water disbursement cone to a wider orientation to disburse a wider apical angle of a water disbursement cone.

A high-pressure pump is in communication with a high-pressure source to increase the pressure thereof prior to the transfer of water to the nozzle member for dispersion within the interior cylinder.

A logic controller is provided having a pressure sensor of the high-pressure source where the logic controller is configured to operate the high-pressure pump to increase the pressure of the high-pressure source. The logic controller is operatively configured to control the actuator of the nozzle member to allow communication of the high-pressure source and the interior chamber. The logic controller is further configured to inject a spray cone mist of water during the upward fuel air compression stroke at a first apical cone angle and inject a spray cone mist of water at the transition from the upward fuel air compression stroke to the downward power stroke at a second apical column angle which is greater than the first apical cone angle where the first and second apical cone angles, with respect to the location of the piston, are such that the spray cone mast does not directly contact the cylindrical wall portion of the interior chamber.

BRIEF DESCRIPTION OF THE DRAWINGS

FIG. 9 shows another schematic view of utilizing a water cooling member to cool water prior to injection into the internal chamber of the internal combustion engine;

FIG. 10 shows another embodiment placing the supercritical cooler downstream of the high-pressure pump;

FIGS. 14-19 show various mechanisms for altering the orifice opening.

DESCRIPTION OF THE PREFERRED EMBODIMENTS

Discussed herein is a system and method for water injection into a combustion chamber for an internal combustion engine. There will first be a description of an overall schematic of one form of carrying out the preferred embodiment, followed by a detailed discussion of the schematic system for injecting the water into the combustion chamber. Thereafter, there will be a description of various nozzles and other alternative schematic embodiments.

Figure 1:
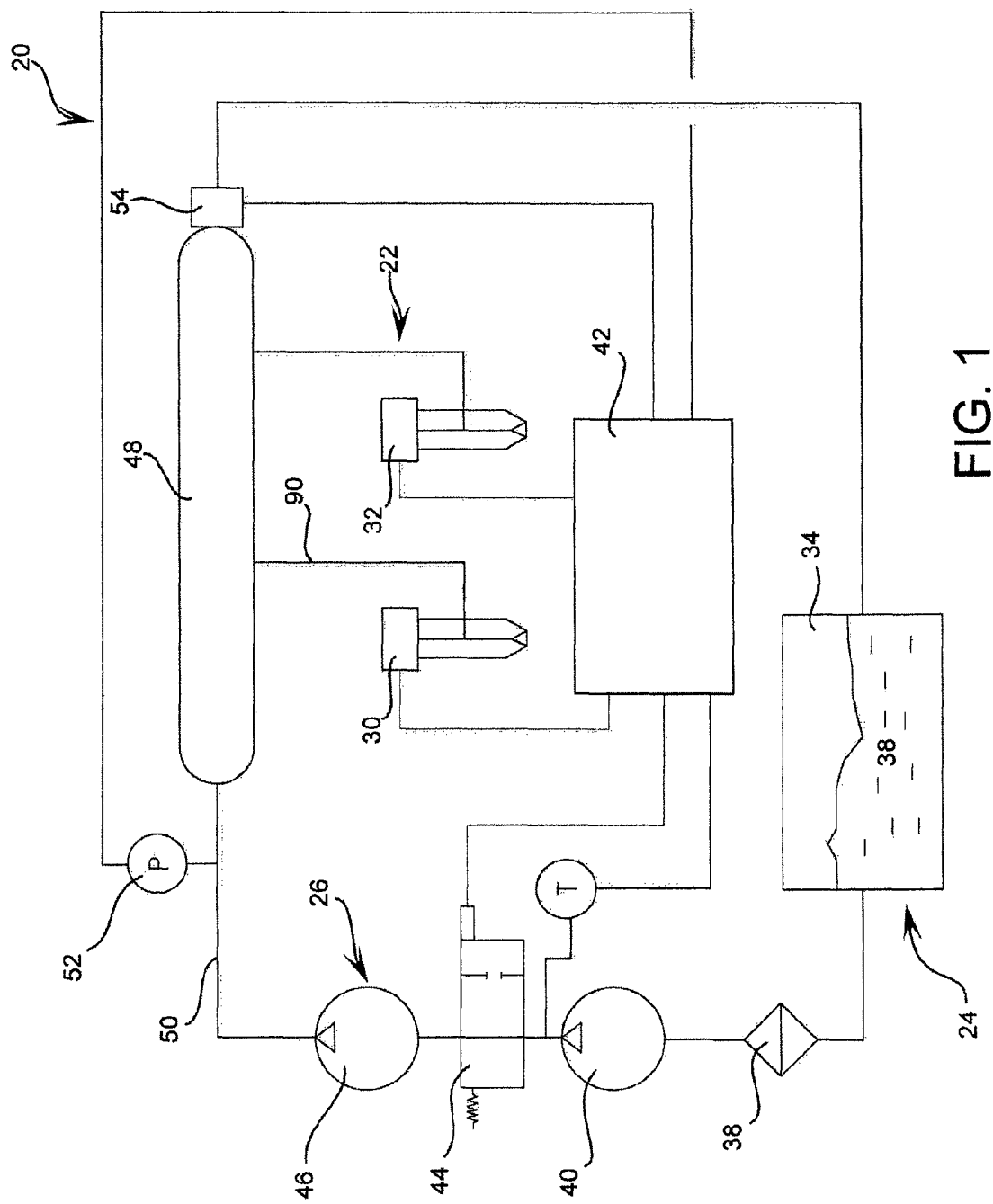
FIG. 1 shows a schematic view of an internal combustion engine system.
Figure 2:
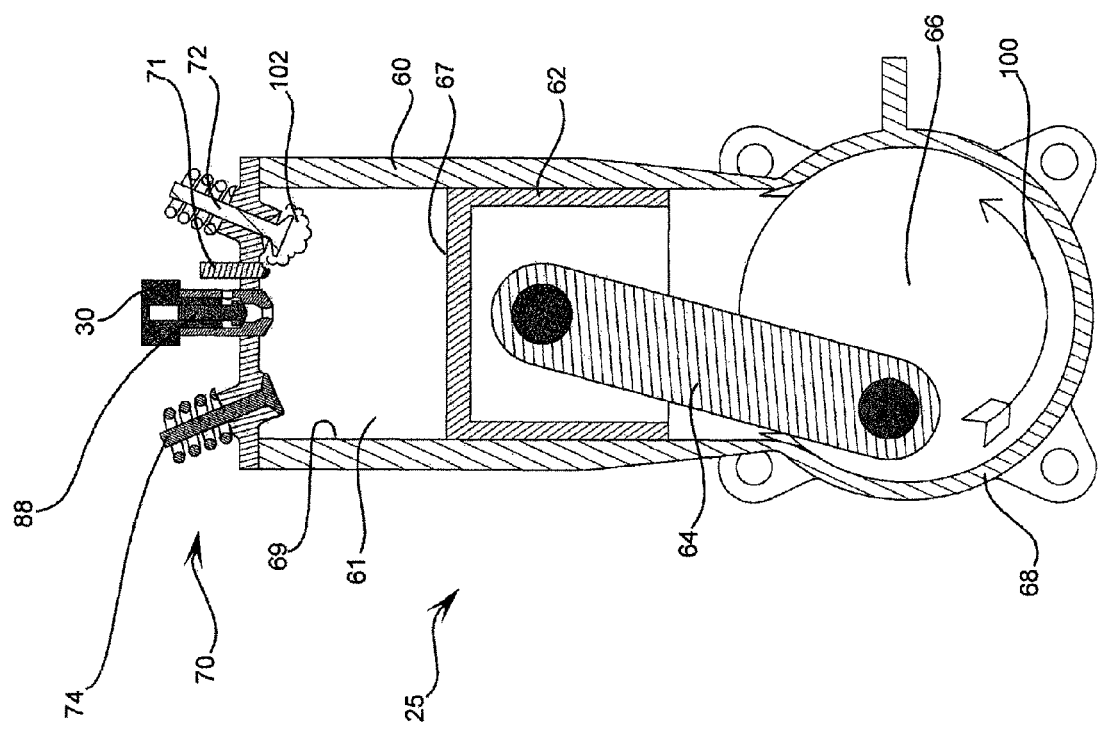
FIG. 2 shows a cross sectional view of a schematic internal combustion engine which in one form is a four stroke engine showing the intake stage of an air fuel mixture within the interior cylinder.

As shown in FIG. 1, there is a schematic system 20. In general, the system comprises a nozzle or nozzle assembly 22, a water reservoir 24, a water distribution system 26, and as shown in FIG. 2, an internal combustion engine 25. The nozzle assembly 22 in one form comprises the first and second nozzles 30 and 32. Of course, depending upon the number of cylinders in the internal combustion engine, any number of nozzles can be utilized. The nozzles will be described further herein with reference to FIGS. 5 and 6.

The water reservoir 24 in general comprises a water tank 34. The water tank 34 holds the water supply 36 which can be from a common source of water or condensed by some water condensation means. A water filter 38 can be utilized. Of course, the water filter 38 can be used prior to the insertion of the water into the tank 36.

The water distribution system 26 in one form comprises a low pressure water pump 40 which is operatively configured to be controlled by the logic controller such as a programmable logic controller (PLC) 42. The PLC 42 will be described further herein, and of course other logic controllers can be utilized, such as (in some forms) a purely mechanical control system.

The PLC controls the various mechanisms in the system 20 such as the flow control valve 44. In one form, the low pressure water pump 40 provides a sufficient amount of pressure to the high-pressure pump 46 which increases the pressure of the fluid for injection into the interior cylinder 61 as shown in FIGS. 2-4 and discussed further herein.

In one form, the high-pressure fluid passes through the manifold 48 where the line 50 has the pressure sensor 52 in communication therewith, which feeds the signal back to the PLC 42. In one form, a pressure reduction valve 54 which operates as a general pressure limiter can be in communication with the manifold 48 to ensure that the pressure therein does not exceed predetermined limits. The high-pressure water is fed to the nozzles 30 and 32, and as noted above, can be fed to a single nozzle for a single chamber engine, or possibly fed to twelve nozzles for a twelve-cylinder engine such as the V-12. With the foregoing general description in place, there will now be a more detailed description of the internal combustion engine 25 with the water injection nozzle 30 in place.

In general, the engine 25 is of a common design. There is a cylinder bore 60 with an interior cylinder 61 having an interior cylindrical wall 69 configured to house a piston 62 having an upper surface 67 therein. The piston is attached to a bar 64 which in turn is attached to a crankshaft-like mechanism 66. The crankshaft is housed within a crank case 68. In a conventional for stroke type engine, the valve system 70 is utilized where the emission valve 72 opens to allow the fuel air mixture to enter the interior cylinder 61. Further, the exhaust valve 74 is configured to open to allow the exhausted gas within the chamber to be expelled during the exhaust stroke.

Of course, internal combustion engines are well known, and various relevant patents such as U.S. Pat. Nos. 1,986,630 and 6,202,613 are hereby incorporated by references. Of course, in other forms, a two-stroke engine can be utilized such that various ports are used to allow for the intake and exhaust of the fuel air mixture. It should be further noted that an ignition member 71 is positioned in the upper portion of the cylinder at the cylinder head 63. Of course, in one form, the ignition member 71 is a conventional spark plug and is described herein with reference to FIG. 6. In one embodiment, the nozzle member 30' is operatively configured to be fitted into a conventional spark plug head mount opening in the cylinder head for a retrofit to an existing engine such that the nozzle member 30' not only supplies the ignition spark to ignite the fuel air mixture, but further provides a system for injecting water into the interior cylinder 61. This embodiment will be described further herein in greater detail.

With the foregoing general description in place, there will now be a discussion of one form of utilizing the nozzle member 30. Before engaging in further discussion of the operation of the system 20 (as shown in FIG. 1) and the engine portion 25, there will be a detailed discussion of the first nozzle mechanism 30 with reference to FIG. 5.

Figure 5:
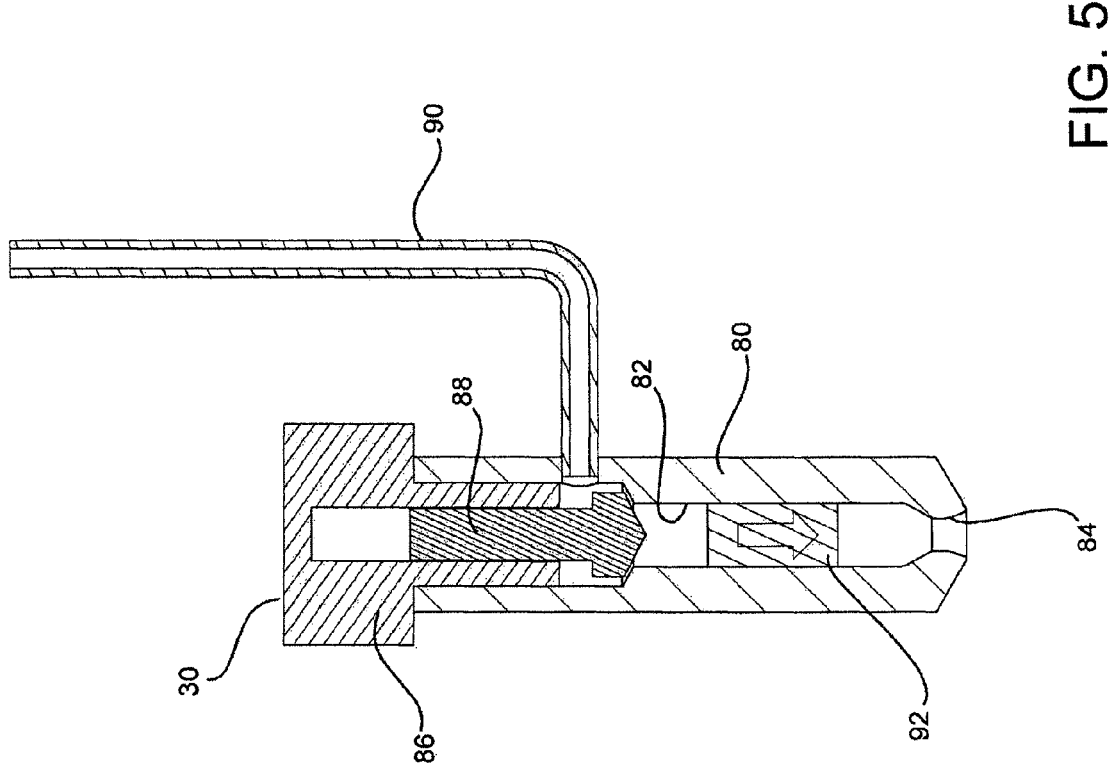
FIG. 5 shows a cross sectional view of a water injection nozzle.

As shown in FIG. 5, the nozzle member 30 has a nozzle body 80 defining a central chamber 82 which has a nozzle tip region 84. In one form, an actuator 86 is utilized where a valve member such as the plunger 88 is schematically shown that is activated by the actuator, such as a piezoelectric actuator device. The water input line 90 is configured to communicate with the interior chamber 82, and in one form, a check valve 92 allows for a one-way flow of water downward into the cylinder of the engine. In one form the line 90 can provide a fuel air mixture from the output line/port 167 of the mixing chamber in FIG. 11.

Figure 7:
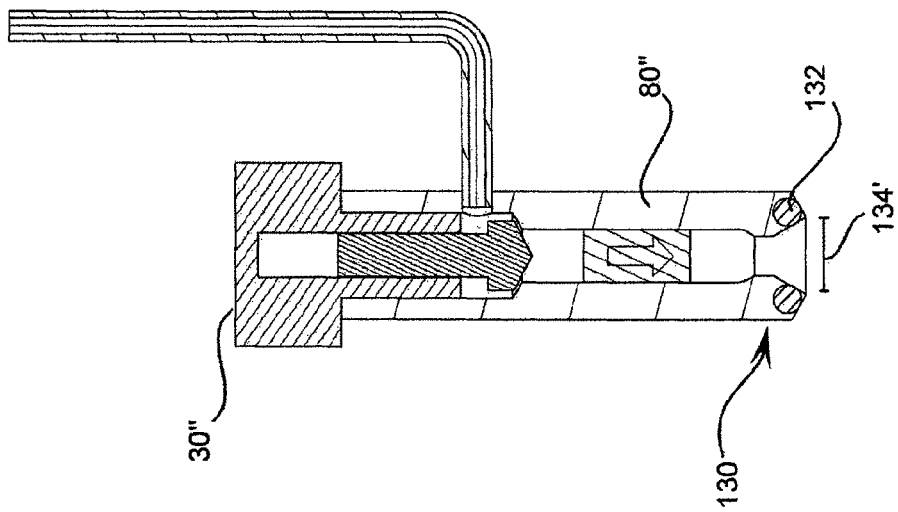
FIG. 7 shows another embodiment of a nozzle member in a first form which is configured to eject water mist at a narrower apical angle.
Figure 8:
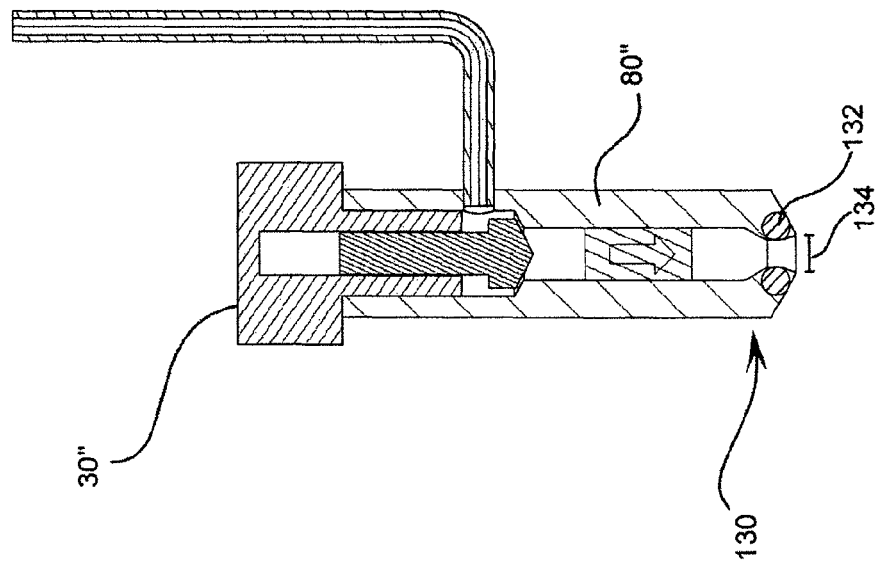
FIG. 8 shows the embodiment of FIG. 7 where the adjustable nozzle tip is configured to disperse water fluid at a wider angle.

The nozzle tip region 84 can be of a multitude of designs, where as described herein with reference to FIGS. 7 and 8, a variation of the design can disperse the frustoconical dispersion of water into the interior cylinder 61 of the engine (see FIG. 2) at a variety of apical angles.

Figure 3A:
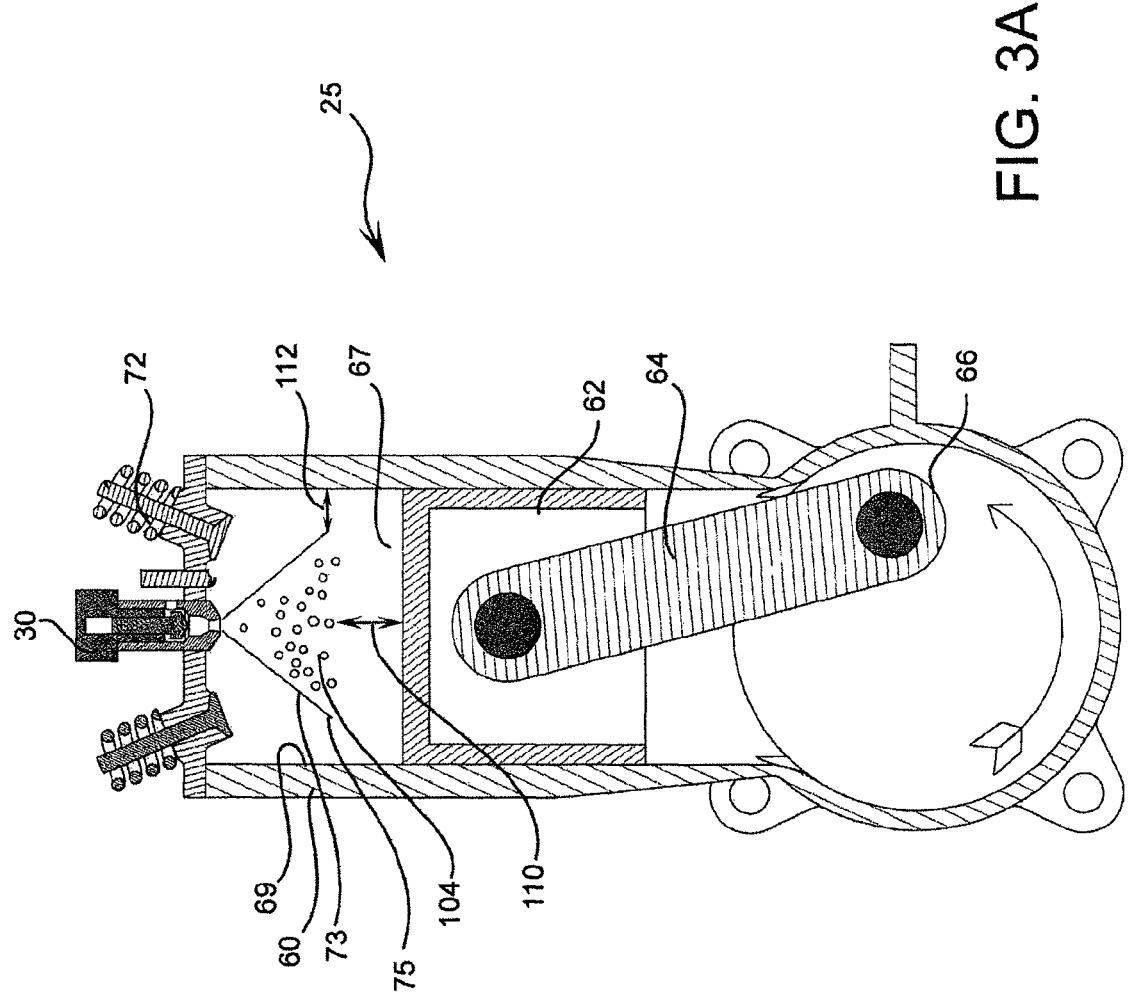
FIG. 3A shows the compression stroke with fuel where a water mist from a nozzle member is projecting water therein.
Figure 4:
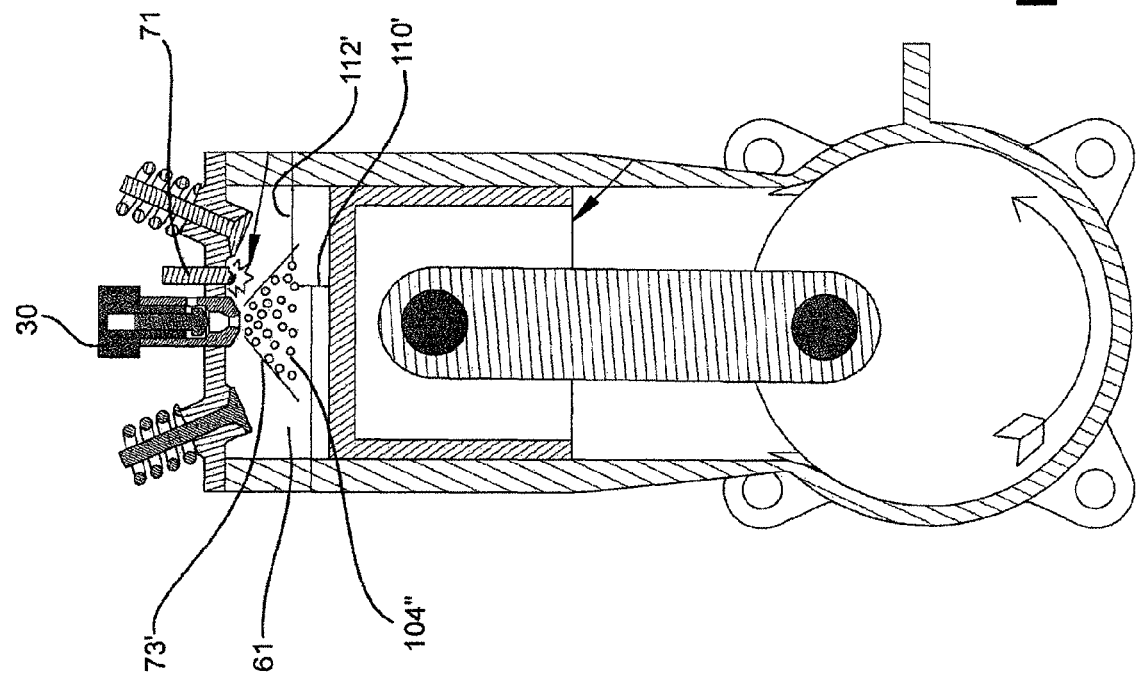
FIG. 4 schematically shows an ignition and a post injection of water in the internal chamber.

Referring now back to FIG. 3A, it can be seen that the rotation of the crank shaft 66 is counterclockwise, as indicated by the arrow 100. Therefore, the piston 62 is in a downward stroke within the interior cylinder 61, and in one form, the valve member 72 is open allowing the fuel air mixture 102 to enter the interior cylinder 61. The nozzle member 30 has the valve member 88 in an open orientation, and in one form, the PLC 42 instructs the valve member 88 to open such that water from the manifold 48 is dispersed through the valve to the water injection line 90 (see FIGS. 1 and 5) into a frustoconical spray cone 104 as shown in FIG. 3A.

It should be noted that a high-pressure system where the manifold 48 allows for a simpler design of the nozzle 30 where the nozzle has a high-pressure control valve 88. The moment the valve is open, the water is dispersed at full pressure and the water entering is entirely dependent upon the time that the valve is open. It should further be noted that having the initial low pressure pump 40 provides a sufficient positive suction head (NPSH) for the intake valve of the high-pressure pump 46. By having the valve and the nozzle, it is desirable to mitigate the amount of leakage of water. It is easier to build the flow control valve 44 for low pressure, and the net static hydro pressure is sufficiently high from the low pressure pump 40. The high-pressure pump should be upstream of the flow control valve 44, otherwise the high-pressure pump could damage the flow control valve.

Referring to FIG. 2, there is an intake stroke and the valve 72 is open. In a preferred form, the nozzle 30 is closed, and fluid is not injected into the interior cylinder 61. The piston 62 is shown traveling in an downward position. In one form, before 15° before top dead center (TDC), water injection starts and the water injection is completed before ignition is initiated.

As further shown in FIG. 3A, there is a dimension indicated generally at 110 to indicate a vertical distance from the water spray 114 to the upper surface 67 of the piston 62. Further, the dimension 112 indicates a general distance between the outer area of the frustoconical water mist 14 and the interior surface 69 of the cylinder 60, which is a function of the actual geometry of the piston. In one form the diameter of the lower perimeter portion 75 of the outer frustoconical area 73 is less than ¾ of the diameter of the interior cylinder 61. The outer frustoconical area 73 of the cone should generally be such that the column of water is not dispersed to the cylindrical wall 69. The gap indicated at 112 can be between ⅙ to 5/12 the diameter of the cylinder 61 and the gap 110 can be for example zero to ½ the height of the cone 104.

Figure 3B:
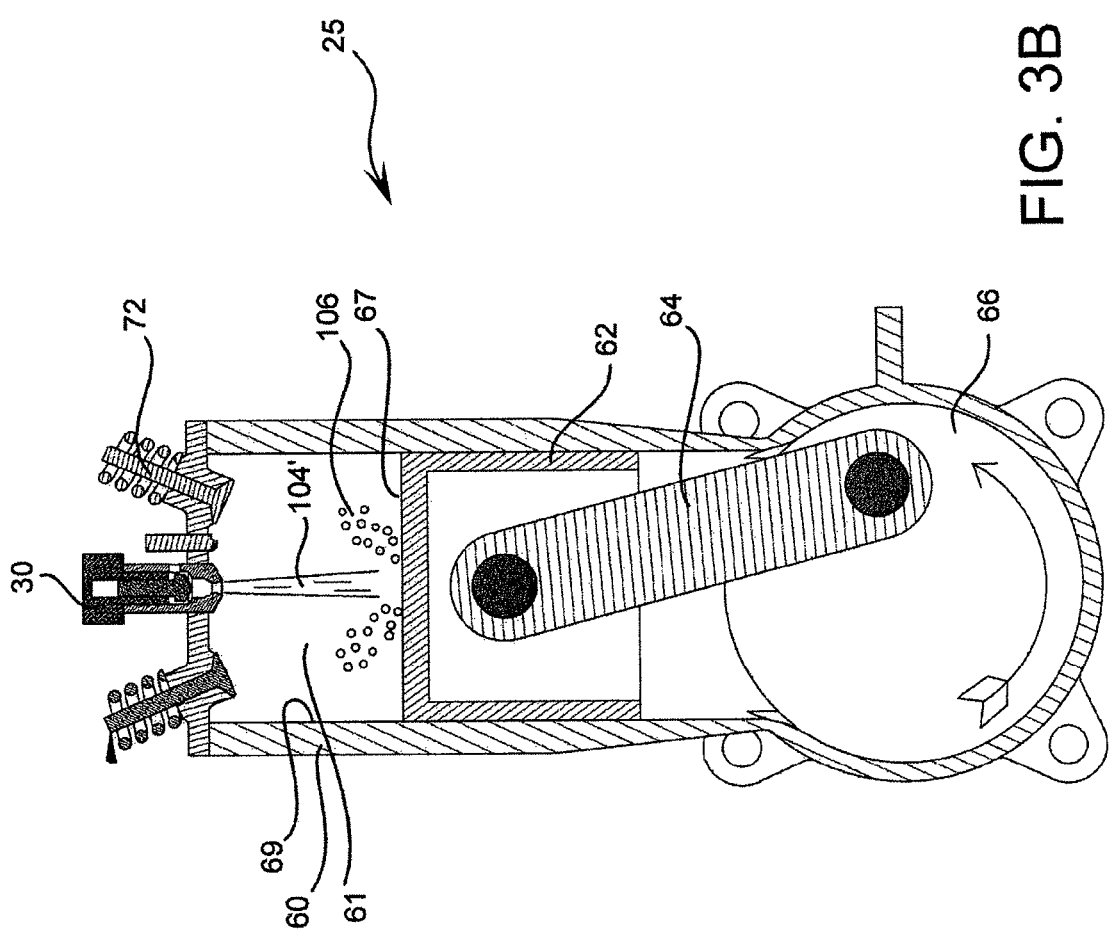
FIG. 3B shows an alternative method of injecting water therein to the internal combustion engine.

FIG. 3B shows another embodiment where the crankshaft 66 advanced such that the piston member 62 is directed upwardly. The emission valve 72 is closed as the pressure within the interior cylinder 61 increases. In one form, the water stream 104' is dispersed on the upper surface 67 of the piston 62, and the water droplets 106 bounce and disperse outwardly. It should be noted that the cylinder is repositioned upwardly at a relatively high velocity, and the timing of the water droplets 106 is such that they should not impact the interior walls 69 of the cylinder 60.

Now referring to FIG. 4, it can be appreciated that the ignition member 71 has induced a spark within the interior cylinder 61. In one form, water is continue to be disbursed within the interior cylinder 61, and the water column indicated at 104" continues to be disbursed such that the dimension 110' and 112' are such that the cone is a wider angle. In this form, the cone angle can be wider by way of utilizing a variable cone dispersion nozzle which is described further herein.

Thereafter, the post-injection occurs approximately no after combustion for a duration during the piston stroke to bottom center. The post-injection helps to further cool the temperature within the interior chamber 61. The combustion temperature rate is not affected but the temperature is lower. The formation of nefarious greenhouse gases such as NO and CO are problematic when the temperature within the cylinders in a combustion engine is too high. The in-cylinder temperature should be lowered approximately to below 1200° Celsius which is both below threshold where NO and CO compounds are created. The water pressure can be between 1000 to 15,000 psi to create the atomized mist.

It should be noted that the nozzle 30 can be very similar to a diesel fuel injection nozzle. With a diesel cycle engine, fuel is injected at high-pressure, and in this case the water droplets are injected at high pressure. It can be seen in FIG. 4 that the cone angle outer region 73.

It should be noted that the engine 25 may also be a two-stroke engine utilizing the water injection cone 104. Of course, in such an orientation the valves would not be necessary. A preferred form of an engine is a high horsepower engine such as a 400 to 5000 hp engine. In a preferred form, static constant speed engine such as stationary rotational driver equipment applications is one desired environment for the present invention.

With regard to the water droplet size, present analysis indicates that one preferred range is 50-100 microns for the water droplets and a broader range of 50 to 250 microns for the water droplet diameter size. The amount of water may be between 10 to 20% on a molar basis of the amount of gas or fuel injected. Of course this range can vary depending on various factors.

With the foregoing in mind, there will now be a description related to the frustoconical shaped water droplet dispersion cone 104. A few of the aspects of the cone dispersion of water include the timing of the injection the cone geometry, the actual water mass that is injected into the chamber, and the size of the water droplets. In one form a 30° cone apical angle is considered to be a desirable range, plus or minus 10°. The cone should be constructed so the water droplets do not hit the side wall of the interior chamber 61 which would compromise the lubricity of the oil film positioned thereon to lubricate the piston's movement. Therefore, the water injection nozzle should be positioned in the upper portion of the piston chamber and directed the water coned thereupon downwardly away from the cylindrical interior walls.

Referring now to FIGS. 7 and 8, there is shown another nozzle embodiment 30" which is similar to the previous embodiments except for the spray cone adjustment system 130. As shown in FIG. 7, the annular ring member 132 is operatively configured to form a narrow passageway 134 for a narrower cone dispersion and further can be repositioned to a wider orientation such as that as shown in FIG. 8 as indicated by the dimension 134' for a broader cone distribution. Of course, this embodiment could be combined with the nozzle embodiment as shown in FIG. 6 to have ignition member further positioned on the main body 80" of FIGS. 7 and 8.

Now referring back to FIG. 3A and FIG. 4, it can be appreciated that the outer area of the cone 71 on FIG. 3A is of a narrower apical angle than the cone 71' in FIG. 4. This can be accomplished by using an embodiment of FIGS. 7 and 8 as well as FIGS. 14-19. The water jet is used partially to cool the igniting electrodes, thereby extending their operating life.

Figure 6:
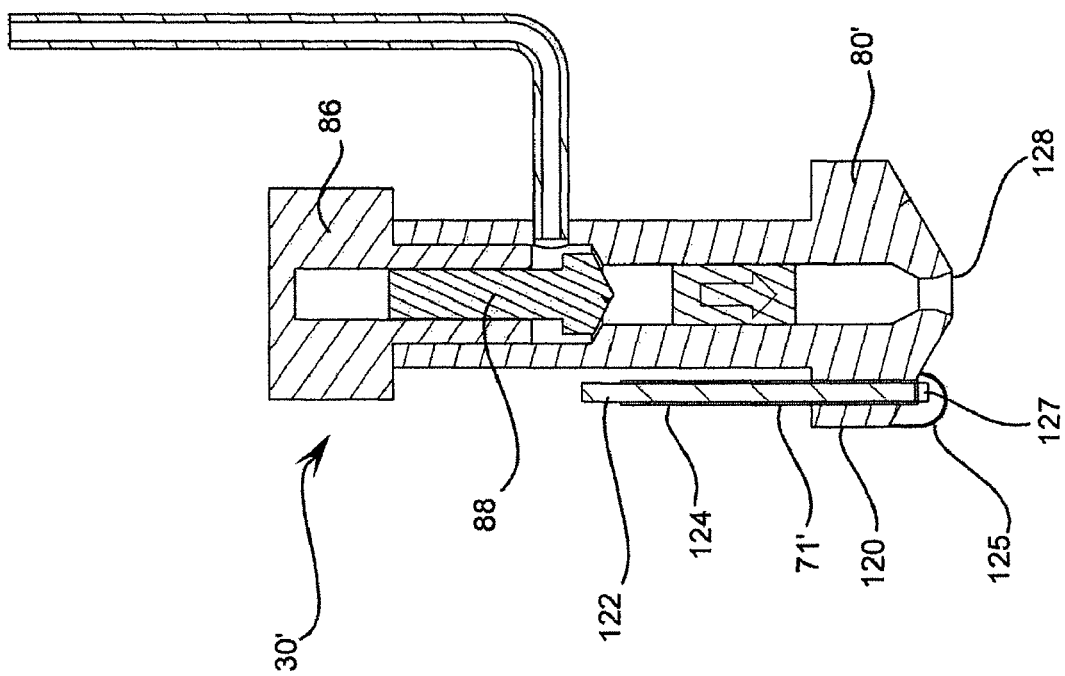
FIG. 6 shows another embodiment of a water injection nozzle where the ignition member is combined therewith and in one form, the water injection nozzle is to be fitted to an opening within an engine created for a conventional spark plug.

With the foregoing description in place regarding the operation of the nozzle with respect to the internal combustion engine, there will now be a discussion of a second nozzle member 30' with reference to FIG. 6. This nozzle member has many similar components to the previous nozzle member 30 shown in FIG. 5; however, the ignition member 71' is positioned within the main body 80'. The other components of the nozzle member 30' are similar to the previous nozzle member 30 as shown in FIG. 5. The pressure control valve 88 and the actuator 86 are of a very similar design. One advantage of having the ignition member 71' as part of the nozzle body 80 is that the nozzle 30' can be easily retrofitted to an existing spark plug hole in the upper portion of a cylinder head of an engine. In this form, the lower cylindrical surface indicated at 120 can be, for example, a threaded male surface of conventional thread pitch to be similar to a conventional spark plug. The electrode portion 122 can have an insulating sheath 124 such that the electrode 122 is in communication with a charged particle source that can be of a conventional design. The anode member 125 is positioned at a predefined distance from the cathode extension 127 to create a spark within the interior cylinder for ignition of the air fuel mixture therein. In one form, the members 125 and 127 are positioned above the lower lip 128 of the main body 80' so the water fluid ejected therefrom does not interfere with the ignition of the ignition member 71'.

FIG. 9 shows another embodiment where downstream of the accumulator 144 is a water-cooling device 145 that is interposed between the accumulator 144 and a pump 146. The water-cooling device reduces the temperature of the water stream to above a freezing point. In one form, the temperature of the water should be between 1° and 35° C. approximately. The cooler water helps the injected fluid cooler water absorb more energy before it evaporates to reduce the temperature of the combustion.

FIG. 10 shows another variation of the system where a water cooling agent 145' is positioned downstream of the pump 46'. As discussed further herein, reducing the water temperature further aids in cooling the interior cylinder temperature to prevent the production of NOxious gases.

In another form, an oxygen injection system can be utilized. This system option enables the dissolution of pure oxygen into the water source. The oxygen supply (from commercially available equipment) would be placed upstream of the pump, or fed directly into the accumulator, to enrich the water stream. This additional oxygen will act as catalyst for the combustion process during ignition, mitigating the flame retardation effects of the water droplets.

Figure 11:
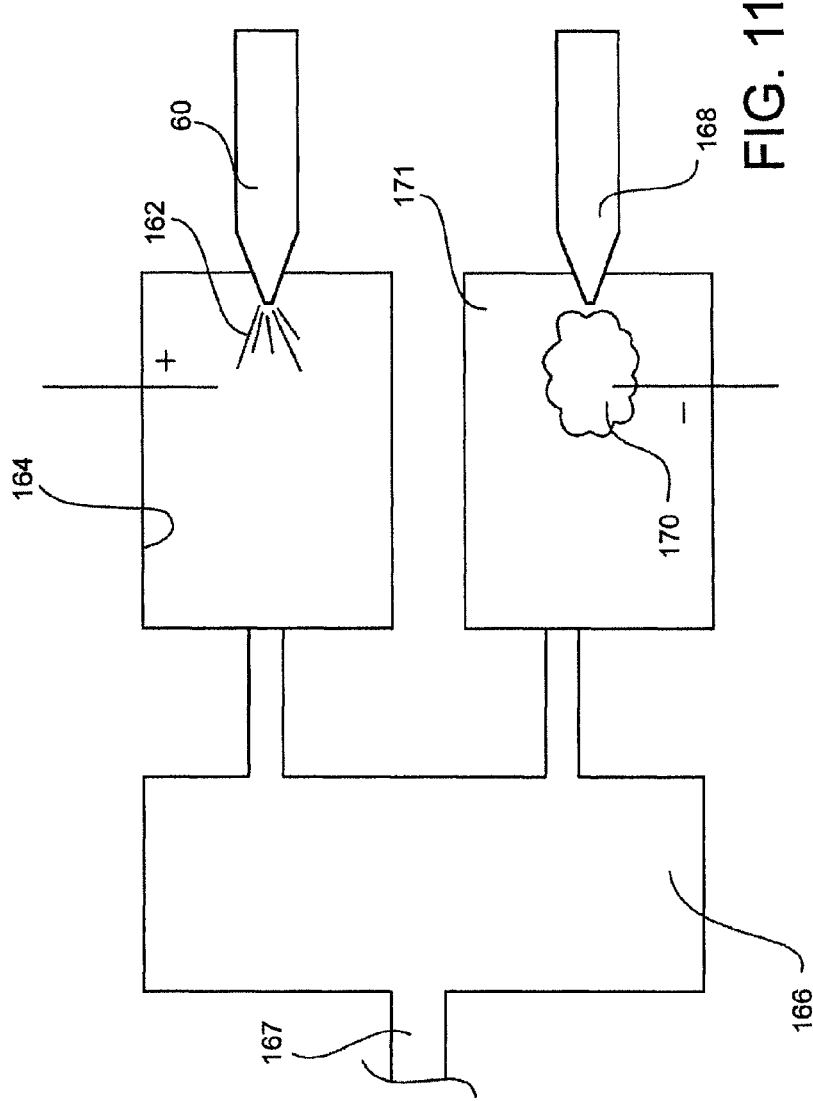
FIG. 11 shows an embodiment where the liquid mist and the fuel are charged whereby they are attracted to one another in a mixing chamber before injected into the interior cylinder.

Now referring to FIG. 11, there is another possible modification that can be utilized with the present water injection system. The mist injector 160 emits a mist-like cone 162 into a first ionization chamber 164. Within the ionization chamber, the various particles are charged either positively or negatively. For purposes of this discussion, we will assume that the water droplets are charged positively and passed to the mixing chamber 166. A similar process occurs with the fuel injection nozzle 168 where a fuel-injected gaseous mist 170 is, for example, negatively charged by the negative ion and the mist 170 is passed to the mixing chamber 166.

Figure 12:
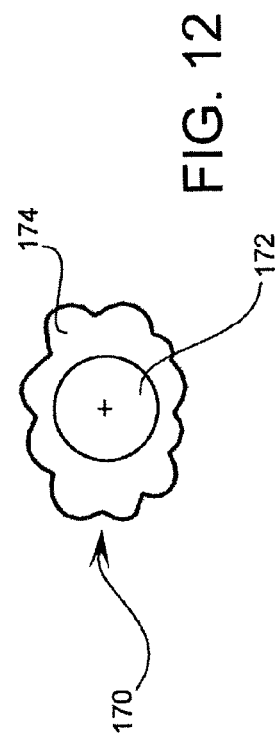
FIG. 12 shows schematically a charged water droplet with an opposingly charged fuel vapor positioned therearound.
Figure 13:
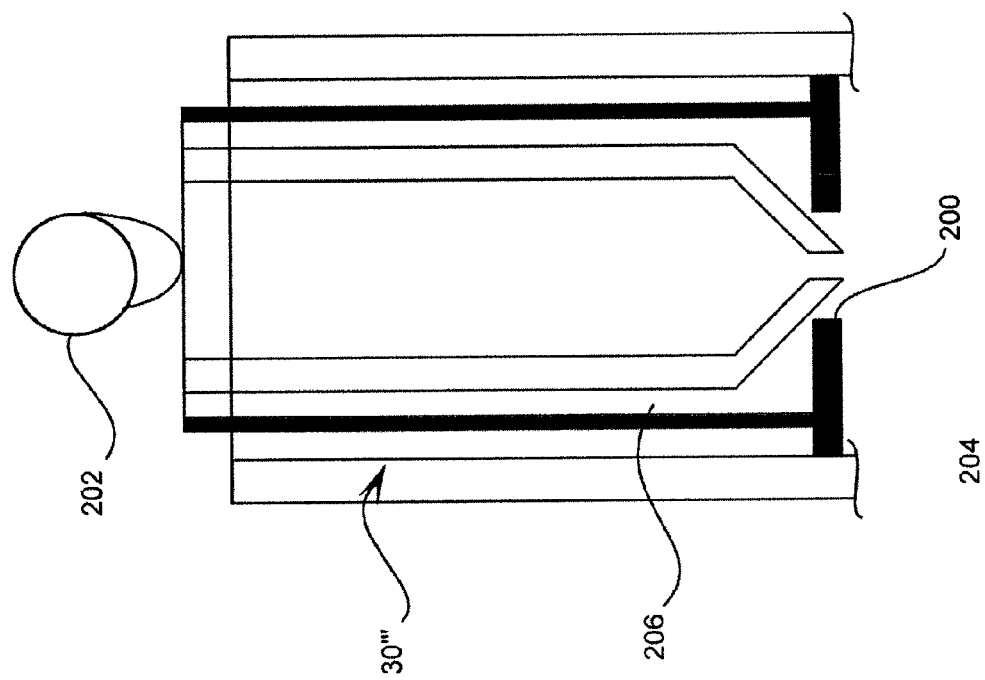
FIG. 13 shows another embodiment of a nozzle member that, for example, can be retrofitted to an exhaust valve or a fuel input valve of an internal combustion engine.

As shown in the lower part of FIG. 12, there is an example of a particle mixture 170 where a positively charged water droplet 172 and a negatively charged fuel gas 174 is positioned therearound. In other forms the anode and cathode of the water and fuel chambers can be switched to change the charge of each substance.

Referring back to FIG. 11, the mixture in the mixing chamber 166 is passed through line 167 and directed to the internal combustion chamber in a similar manner as described above, but instead of separating the dispersion of fluid within the chamber between the fuel and the water, the water fuel mixture is injected therein. Of course, this combination can be utilized with the previously mentioned combination such that pure water is injected in the latter portion of the upward stroke. Further, pure fuel can be injected previously; this form only supplements the process, or alternately, this form of fuel injection can be used exclusively. Of course, the water injection in the downward stroke would be executed with only water and not a fuel water droplet mixture.

With the foregoing in mind, there will now be a description of another form of a water mist injection embodiment which is combined with a fuel injection that shares a common orifice. Referring to FIG. 12, where there is a cross-sectional view of an injection nozzle 30''' where the fuel air mixture and water mist shares a common orifice 200. The injection nozzle can be adapted to disperse fuel as well as water at different intervals where that the injection nozzle 30''' can be retrofitted to an existing engine by replacing one of the valves, namely the fuel intake valve. As shown in FIG. 12, the schematic cam 202 is utilized as the timing device to inject the water where an internal valve-like system is controlled by the rotational position, and basically the orientation of the piston. Alternatively the member 202 can be an actuator such as a piezoelectric actuator similar to the actuator 86 described above. Directly attached to the engine cam shaft has advantages where the valve action directly correlates to the orientation of the piston and the timing of the firing of the spark plug. Basically, the internal water mist nozzle 204 will be in communication with the orifice port and be ejecting water therefrom in one form at approximately 30° from top dead-center of the piston, up to a maximum in one form of the spark ignition. Thereafter, the water mist nozzle is again in communication with the orifice ejecting water for the second phase in the downward stroke of the piston to cool the gas therein to prevent Noxious gases from forming. Thereafter, the mist nozzle 204 rises upwardly where the air exhaust valve opens to exhaust the combusted gas through the annular channel 206. In other forms the nozzle member 30''' could replace the fuel injection valve and the fuel air mixture will pass through the channel 206.

In the downward stroke in a four-stroke cycle, the injection valve will adjust to place the fuel injection chamber in communication with the piston chamber to allow fuel to be injected therein. On the upward stroke, the water injection portion of the nozzle is now in communication with the orifice to allow mistified water to enter as described above in the pre-ignition phase (i.e. in one form 30° from top dead center positioning). In this form, the spark plug is left intact and the fuel intake port is replaced.

Still referring to FIG. 12, it should be reiterated that in the first embodiment, the gas injection should be done prior to the water injection to prevent water from touching the metal lateral walls. That is one reason why the water injection is done in the latter stages of the piston stroke in the upward stroke in the compression phase of the four-stroke cycle.

Therefore, it can be appreciated that the above teachings can be done in various combinations to form a number of embodiments. Further, other variations could include having two water injection nozzles where, for example, a first water injection nozzle having a first diameter cone injects water after the fuel is in the chamber 61 and prior to the ignition. Further, a second water injector having, for example, a smaller cone diameter could inject water into the chamber when the piston is traveling downwardly in the expansion stroke so the smaller cone does not hit the lateral wall portions of the cylinder 69.

The further variations of the fuel injection system can include a fuel water mixing assembly where, referring to say FIG. 1, somewhere along the fluid flow circuit, the fuel will be mixed with the water entering the injector. This system is similar in application to that of the oxygen-enrichment scheme discussed above, and can be used concomitantly with it. The fuel is forced fed into the water accumulator, where some of it dissolves in the water. This fuel-rich water then promotes the flame propagation during combustion. Of course, variance from this embodiment could include providing a combining chemical, perhaps a coagulant-type chemical that will have polar and non-polar ends to help link and mix the fuel with the water mixture. Further, this can account for a portion of the fuel injected into the chamber for pre-combustion where an additional fuel inlet valve can be utilized to inject fuel into the chamber 61 as shown in FIG. 2. Further, there may be a separate parallel line similar to that as shown in FIG. 2 where pure water is injected into the chamber 61 in the post combustion phase of water injection in the downward stroke of the piston. Another possible modification could include various alternative control systems for controlling the injection of the water. A separate controller governing all components of the water injection system is connected directly in to the engine management system, from which it receives signals for the timing of the various operations.

Figure 15:
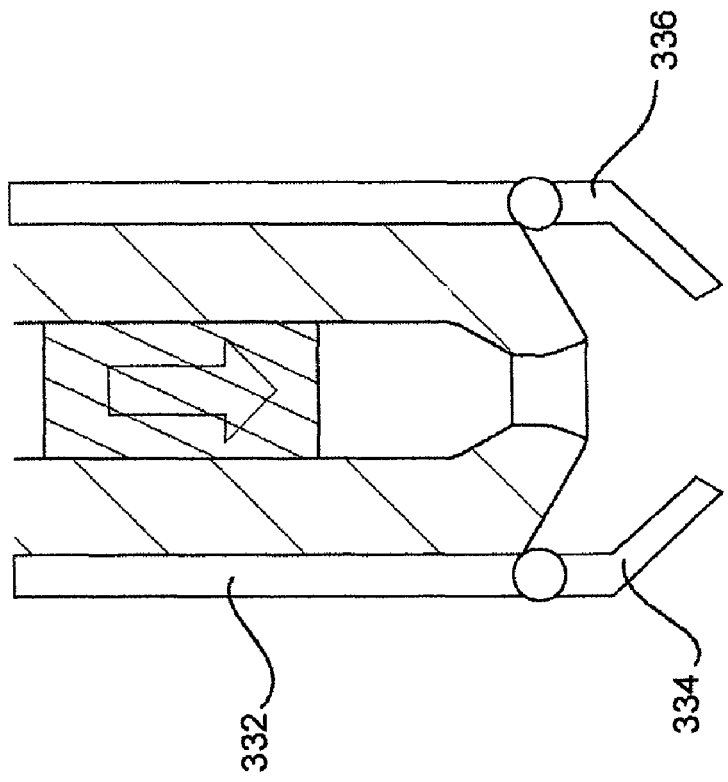
Figure 14:
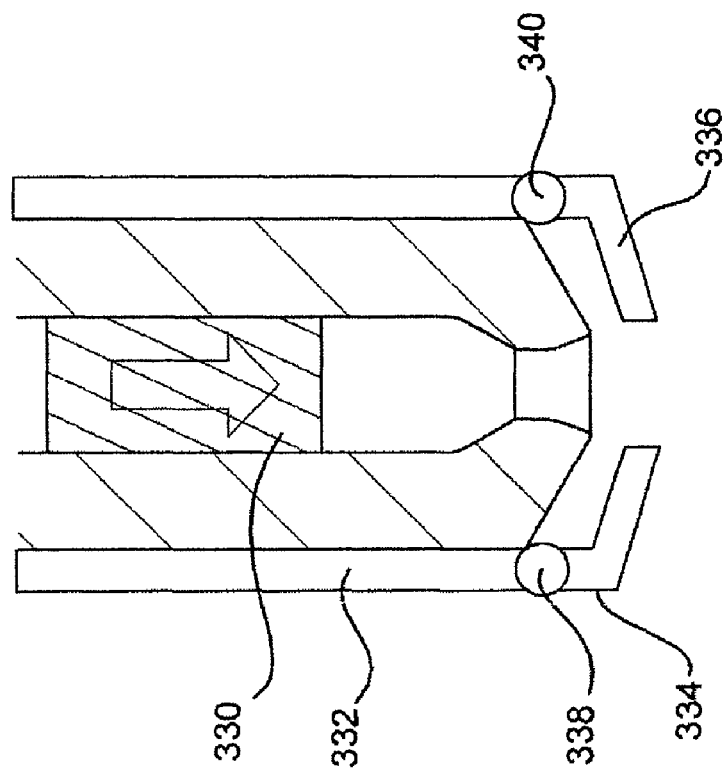

As shown in FIGS. 14-19, there are various forms of adjusting the width of the water cone dispersion pattern. FIGS. 14 and 15 shows one form where the nozzle member indicated at 330 has the housing 332 positioned therearound. The swivel members 334 and 336 are pivotally attached at the locations 338 and 340. In one form, the swivel members 334 and 336 can be, for example, split portions of a frusto-conical member. FIG. 15 shows the members 334 and 336 in an open orientation to in one form provide a more disbursed cone. Of course, with the complex nature of fluid dynamics, a designer can empirically determine the desired cone opening by adjusting the members 334 and 336 (as well as the other adjustment members described below).

Figure 16:
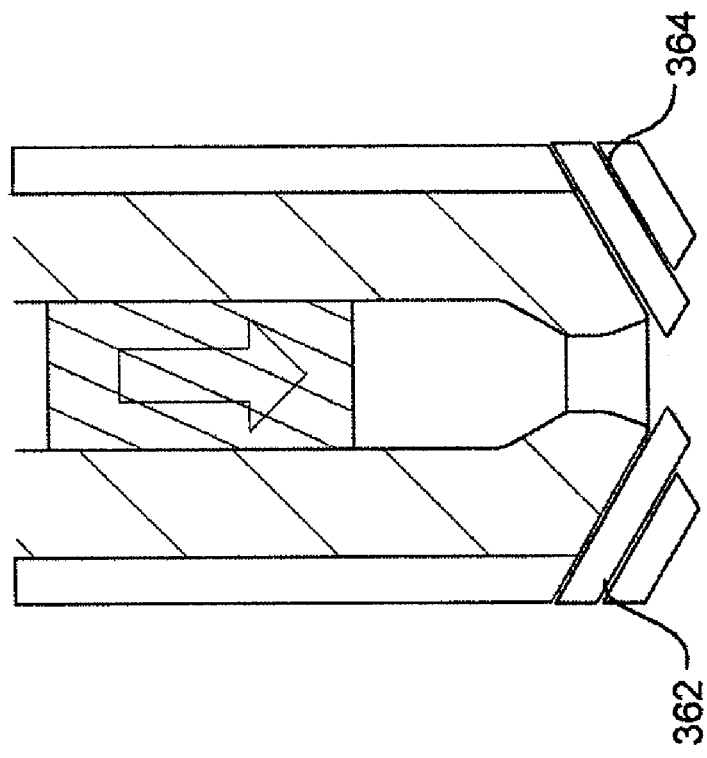
Figure 17:
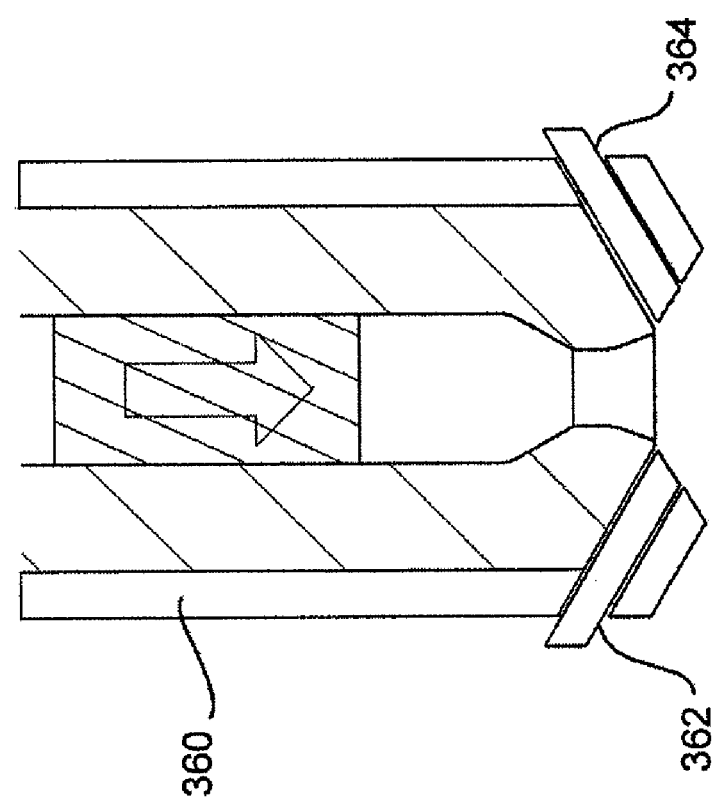

FIGS. 16 and 17 show another embodiment where the casing 360 houses the extendable members 362 and 364. As shown in FIG. 16, the members 362 and 364 are in a retracted orientation. These members can be activated by an electromechanical device for quick actuation. FIG. 17 shows the members 362 and 364 in a retracted orientation to alter the cone diameter.

FIGS. 18 and 19 shows another embodiment where a slider plate mechanism utilizing slider plates 370 and 372 are utilized. FIG. 18 shows the members 370 and 372 in a closed orientation an actuator can reposition the slider plates to an open orientation as shown in FIG. 19. The members 370 and 372 can be operated in one form by way of an electromagnetic device where the outer surface area 374 can for example be a portion of an electromagnetic actuator. Of course other forms of restricting the orifice can be utilized.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

Therefore I claim:

1. A nozzle member configured to fit into a threaded opening provided for a conventional spark plug of an internal combustion engine having an interior cylinder, the nozzle member comprising:

a. a main body with a lower threaded region, the main body having an interior chamber, the main body providing an upper opening for a high pressure water input line, and a body having a nozzle tip region configured to be in communication with the interior cylinder when the main body is threadedly attached to the threaded opening which is provided for a conventional spark plug of the internal combustion engine, b. a valve member positioned in the interior chamber of the main body that is controlled by an actuator between an open orientation and a closed orientation, where in an open orientation the nozzle tip region is in communication with the high-pressure water input line, c. an ignition member positioned in the main body which is in communication with the interior cylinder of the internal combustion engine when the main body is threadedly attached to the threaded opening provided for a conventional spark plug, where the ignition member is provided with a cathode extension and an anode member where the cathode extension and anode member are positioned above a lower lip of the nozzle tip region.

2. The nozzle member as recited in claim 1 where the actuator is controlled by a logic controller where the valve member opens as a piston and the anterior chamber of the internal combustion engine repositions upwardly during a compression stroke.

3. The nozzle member as recited in claim 2 where as the piston is in a first orientation moving upwardly in a compression stroke, a spray cone adjustment system of the nozzle member produces a water mist cone at a first apical angle, and as the piston moves to a second orientation reducing the volume of the interior chamber, the spray cone adjustment system disperses a water mist cone of a second apical angle which is greater than the first apical angle.

4. The nozzle member as recited in claim 1 where a check valve is interposed between the nozzle tip region and the high-pressure water line so as to only allow the water to flow from the high-pressure water line to the interior cylinder.

* * * * *